Feb. 5, 1963  J. A. BOYLE ETAL  3,076,634
LOCKING MEANS FOR COMPRESSOR AND TURBINE BLADES
Filed June 7, 1960                                2 Sheets-Sheet 1
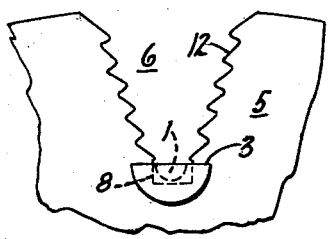
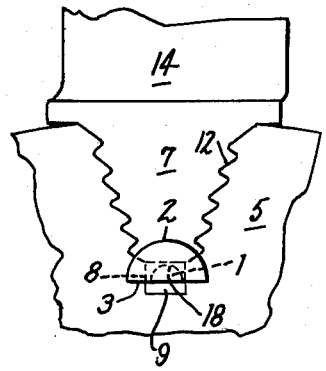
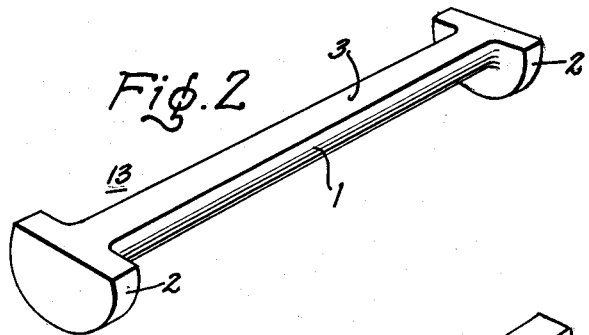
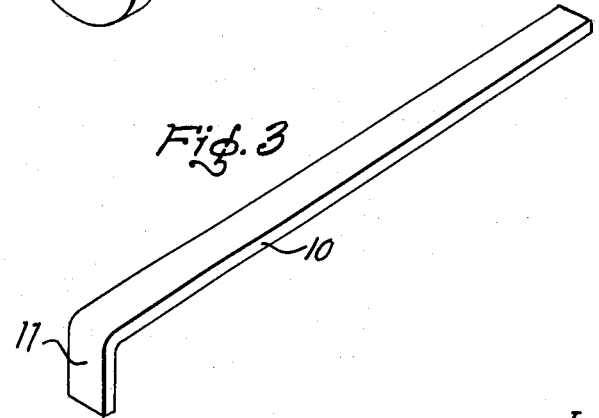
Inventors
John A. Boyle
John G. Garnett
by W. C. Cutchen
Their Attorney Feb. 5, 1963 J. A. BOYLE ETAL 3,076,634
LOCKING MEANS FOR COMPRESSOR AND TURBINE BLADES
Filed June 7, 1960 2 Sheets-Sheet 2
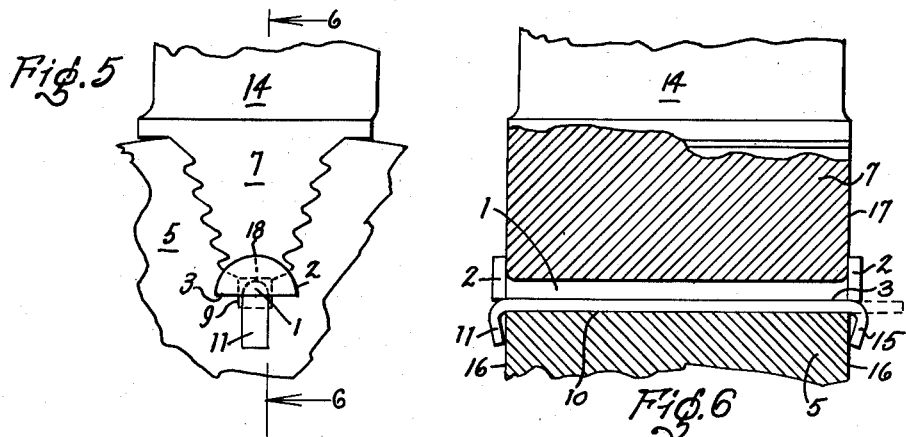
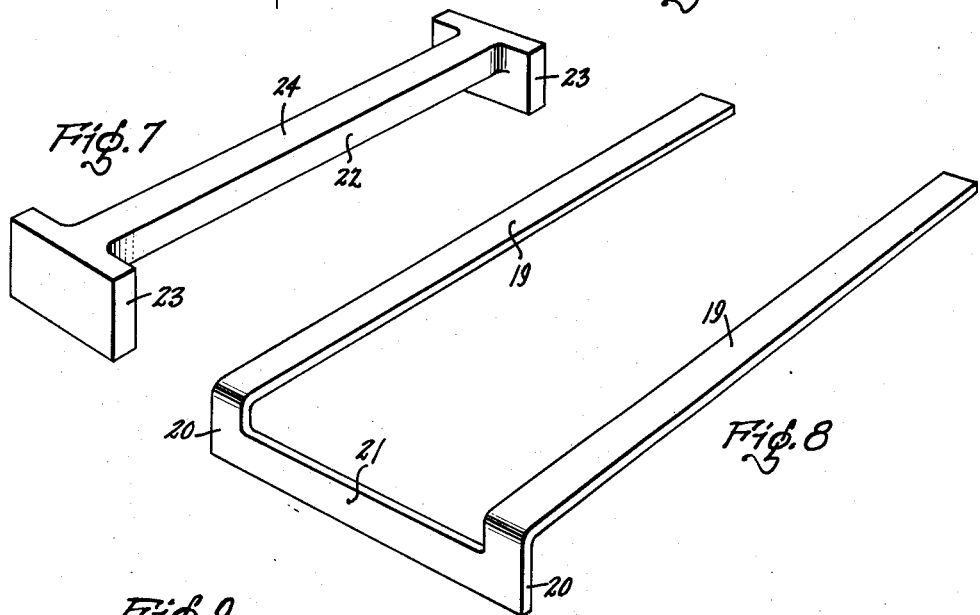
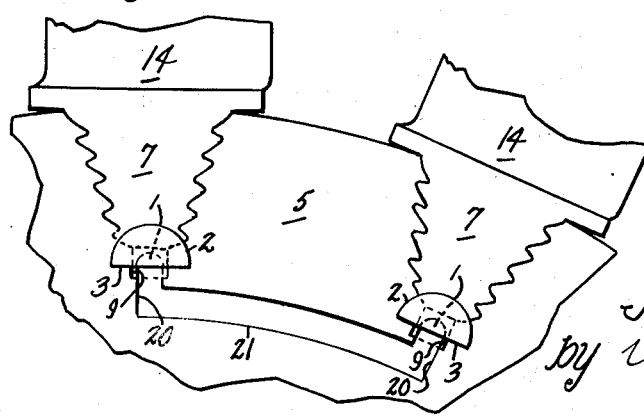
Inventors
John A. Boyle
John G. Garnett
by W. C. Cutch
Their Attorney

United States Patent Office 3,076,634
Patented Feb. 5, 1963

3,076,634
LOCKING MEANS FOR COMPRESSOR AND TURBINE BLADES
John A. Boyle, Sale, and John G. Garnett, Winton, Eccles, England, assignors to Associated Electrical Industries Limited, London, England, a British company
Filed June 7, 1960, Ser. No. 34,538
Claims priority, application Great Britain June 12, 1959
9 Claims. (Cl. 253—77)

This invention relates to the assembly of blading in elastic fluid machines such as compressors and turbines, and more particularly to blade locking pin arrangements for preventing axial movement of the blading after assembly.

A compressor or turbine rotor is commonly fabricated from one or more rotor disks or hubs commonly called wheels, each wheel supporting a plurality of radially extending blades from grooves disposed circumferentially about its periphery. During machine operation, the fluid contacting the blades exerts axial thrust loads on the blades, thus making it necessary to lock the blades against axial movement relative to the disk.

The problem of locking blades against axial movement is particularly acute in large rotary machines in which the blading is subjected to heavy axial thrust loads. A locking device commonly used comprises a locking strip or plate located in the blade receiving groove between the blade root or base portion and the bottom of the groove, the strip having axially extending end tabs which project beyond the ends of the groove. Each tab in application is deformed against the ends of the blade root and the side faces of the wheel to lock the blade in the groove and prevent axial movement of the blade within the groove. In small machine applications, the tabs are both strong enough to hold the blade in the groove and flexible enough to fully close against the blade root and the wheel. For larger machines having blading subjected to greater thrust loads, heavier and stronger locking strips are required to retain the blade base portions in the grooves. As machine size and thrust loads increase, this type of locking device becomes less satisfactory since the strength increase is necessarily accompanied by a decrease in strip flexibility. This decrease in flexibility can result in the tabs not fully closing against the blade root and the side faces of the wheel, thus allowing axial wobble of the blade within the groove. In cases of particularly heavy and rigid tabs, the tabs may even break while being deformed against the ends of the blade base and the side faces of the wheel.

It is an object of the present invention to provide improved blade locking means for preventing axial movement of turbines blades or the like relative to a supporting wheel.

It is also an object of this invention to provide blade locking means of the type mentioned above that is equally suitable for use with small blades subject to light thrust loads or with large blades subject to heavy thrust loads.

A further object is to provide blade locking means for preventing axial wobble of turbine blades during operation.

A further object is to provide turbine blade locking means which can be readily disassembled and reapplied.

Yet another object is to provide blade locking means that will readily permit axial removal or insertion of turbine blades from either side of a rotor wheel.

Briefly stated, in accordance with the illustrated embodiments of the invention, a turbomachine blade locking means is provided for locking a blade against axial movement and wobble during machine operation. The locking arrangement may comprise a pin having enlarged truncated or semi-circular head portions at each end, the pin being rotatably positioned in a blade receiving groove in the wheel periphery with the head portions extending axially beyond the groove and engaging the faces of the wheel at the ends of the groove. The truncated head portions of the locking pin are shaped so that the rotor blade base portion can be axially inserted from either side into the wheel groove when the pin is in a first rotatable position within the groove with the truncated head portions extending towards the axis of the wheel. After insertion of the blade base into the wheel groove, the locking pin is rotated into a second position in which the enlarged truncated head portions extend away from the axis of the wheel and engage the ends of the blade base as well as the faces of the wheel. A retaining strip having deformable end portions is then inserted into the groove to prevent further rotation of the locking pin and thereby retain the locking pin in its second or blade locking position. Since the blade base and the wheel groove are both approximately the same axial length, it is obvious that the enlarged head portions not only will prevent axial removal of the blade base from the groove, but also will prevent axial wobble of the blade during machine operation. Radial movement of the blade is prevented in a conventional manner by a dovetail or similar configuration of the blade base and the wheel groove.

While the specification concludes with claims particularly pointing out and distinctly claiming the subject matter of the invention, it is believed the invention will be better understood from the following description taken in connection with the accompanying drawings in which:

FIG. 1 is a fragmentary end view of a turbine wheel and blade receiving groove with the locking pin in its blade receiving position;

FIG. 2 is a perspective view of one embodiment of the locking pin in which the pin and the truncated head portions have semi-circular configurations;

FIG. 3 is a view similar to FIG. 2 of a retaining strip having a preformed end;

FIG. 4 is an end view similar to FIG. 1 showing a blade base positioned in the wheel groove and the locking pin rotated into its blade locking position;

FIG. 5 is an end view similar to FIGS. 1 and 4 showing the retaining strip holding the locking pin in its blade locking position;

FIG. 6 is a section view along lines 6—6 of FIG. 5;

FIG. 7 is a perspective view of a second embodiment of the locking pin in which the pin shank has a square cross-section and the truncated head portions have rectangular configurations;

FIG. 8 is a perspective view of two retaining strips joined at one end by a preformed yoke; and FIG. 9 is a fragmentary end view similar to FIG. 5, but showing the application of a double retaining strip of FIG. 8 to a turbine wheel.

Referring first to FIGS. 1-6 of the drawings, a turbine wheel 5 is usually provided with an evenly spaced circumferential row of axially extending V-shaped dovetail blade locking grooves such as the grooves 6 which may be provided with serrations 12 extending axially along the sides of the V. Obviously, other types of locking grooves may be used in place of the illustrated dovetail groove having the serrations 12. A base portion 7 of a rotor blade 14 is received in each groove, the base portion 7 having a dovetail configuration substantially the same as that of the groove 6. The base 7 fills the entire axial length of the groove so that the ends 17 of the base 7 are flush with the side faces 16 of the wheel 5. An axially extending slot 8 passes through the wheel at the bottom of each of the dovetail grooves 6.

A locking pin 13 for locking the dovetail base 7 in the groove 6 is shown in FIG. 2. The locking pin comprises a central shank 1 and enlarged head portions 2 at each of the ends of the pin. The length of the central shank 1 is great enough to allow the pin to fit into the slot 8 at the bottom of the groove 6. A flat surface 3 extends axially along the shank 1 and the enlarged head portions 2. In the embodiment of the locking pin shown in FIG. 2, the shank and the head portions have semi-circular configurations.

Now referring more particularly to FIGS. 1 and 6, the locking pin 13 is positioned with the shank 1 in the slot 8 and the enlarged semi-circular head portions 2 extending axially beyond the slot to snugly engage the side faces 16 of the wheel 5. Since the shank 1 and the slot 8 are approximately the same axial length, the engagement between the head portions 2 and the wheel side faces 16 will permit no axial wobble of the locking pin 13 within the slot 8. With the locking pin rotatably positioned in the slot with the flat surface 3 radially outward and the semi-circular head portions 2 extending inwardly towards the axis of the wheel 5 as shown in FIG. 1, the base portion 7 of the blade 14 can be axially inserted into the groove 6 since the flat surface 3 is sufficiently low in the groove 8 to clear the lower extremity 18 of the dovetail blade base 7. It is now obvious that the blade base 7 can be inserted from either side 16 of the turbine wheel 5. Radial movement of the blade base 7 within the groove 6 is prevented by the dovetail serrations 12 of the groove 6 and the corresponding serrations on the blade base 7.

To lock the blade base 7 against axial movement within the groove 6, the locking pin 13 is rotated within slot 8 to the position shown in FIG. 4 where the flat surface 3 is radially inward and the semi-circular enlarged head portions 2 extend radially outward of the axis of the turbine wheel 5. In this position, the enlarged head portions 2 engage not only the side faces 16 of the wheel 5, but also the ends 17 of the dovetail blade base 7. By engaging both the wheel 5 and the blade base 7, the head portions 2 axially lock the blade base 7 within the groove 8. In addition, since the groove 6, blade base 7, and locking pin shank 1 are all the same approximate axial length, axial wobble of the blade base 7 within the groove 6 is prevented by the enlarged head portions 2 of the locking pin 13.

Thus, it can be seen that the locking pin 13, while equally useful in small machines having blading subjected to light thrust loads, is particularly applicable in large machines where the blading is subjected to heavy thrust loads, since the head portions 2 need not be deformed to lock the dovetail blade base 7 against axial movement and can therefore be made as heavy as required to resist the thrust loads exerted by the blade base. Additionally, there is no tendency for wobble of the blade base 7 as the thrust load increases due to inflexibility of the locking pin 13. On the contrary, increased inflexibility of the locking pin 13 will tend to decrease wobble of the blade base 7 since there will be less "give" to the head portions 2. Since the locking pin 13 is not deformed in application, it can be disassembled and reapplied, thus resulting in a substantial cost savings.

In order to retain the locking pin 13 in its rotated blade locking position shown in FIG. 4, a retaining strip 10 of light, flexible material is inserted into the space 9 in the slot 8 between the flat surface 3 of the locking pin 13 and the bottom of the slot 8. Retaining strip 10, which may have a preformed end 11 bent at 90° to the rest of the strip, is inserted axially into the space 9 until the end 11 contacts one side face 16 of the wheel 5. As illustrated in FIG. 6, the other end 15 of the strip 11 is then deformed against the other side face of the wheel 5. By filling space 9 below the pin shank 1, the retaining strip 10 prevents rotation of the locking pin 13 out of its blade locking position. It should be carefully noted that no axial thrust loads are exerted on the deformed ends of the retaining strip 10 and that the sole function of the strip 10 is to prevent undesired rotation of the locking pin 13. The ends 11 and 15 of the strip 10 are deformed against the sides 16 of the wheel 5 solely to retain the strip 10 in the slot 8. Since no thrust loads are exerted on the strip ends 11 and 15, heavier, inflexible strips need not be used as the machine size increases.

It is obvious that the retaining strip 10 need not necessarily be formed with the preformed end 11 bent at 90° to the rest of the strip. In the event that such a preformed end is not utilized, the retaining strip 10 is inserted axially into the space 9 in the slot 8 until both ends of the strip extend axially beyond the ends of the slot 8. Both of the axially extending ends are then deformed against the side faces 16 of the wheel 5 in the same manner that the end 15 is deformed against the wheel in FIG. 6.

In a second embodiment of the locking pin shown in FIG. 7, the locking pin comprises a central shank 22 and enlarged head portions 23 at each end of the pin. A flat surface 24 extends axially along the shank 22 and the enlarged head portions 23. The shank 22 has an approximately square cross-section instead of the semi-circular configuration of the shank 1 shown in FIG. 2. Likewise, the truncated head portions 23 have rectangular configurations in place of the semi-circular configurations of the head portions 2 shown in FIG. 2. The locking pins shown in FIGS. 2 and 7 are identical in their mode of application.

Two or more adjacent retaining strips similar to that shown by FIG. 3 of the drawings can be joined together for simultaneous insertion into two or more adjacent turbine wheel slots. As shown in FIG. 8 for example, two retaining strips 19 having preformed ends 20 bent at 90° to the remainder of the strips are joined by a yoke 21. As is obvious from FIG. 8, the joined retaining strips 19 and the yoke 21 may be formed from a single piece of sheet metal. Since the strips 19 and the connecting yoke 21 are extremely flexible, the slight curvature between adjacent wheel slots 8 need not be considered when forming the retaining strips since there is sufficient flexibility to the metal to compensate for the slight curvature of the yoke 21 as shown more clearly by FIG. 9 of the drawings. Of course, in the event that the wheel 5 has a small radius so that the curvature between adjacent slots 8 is relatively great, the yoke 21 can be formed so as to compensate for the curvature.

Thus, it can be clearly seen that the invention provides a locking pin arrangement for holding blades against axial movement which is strong enough to resist large as well as small thrust loads. Additionally, the pin locks any size blade without wobble; and, since it is not deformed in application, the locking pin can be disassembled and reapplied. Also, the locking pin permits axial insertion of the blade base from either side of the rotor disk.

While other modifications of this invention and changes and substitutions of equivalents which might have been made have not been described in detail, it is desired to cover by the appended claims all such modifications as fall within the true spirit and scope of the invention.

What we claim as new and desire to secure by Letters Patent of the United States is:

1. In a turbo-machine rotor assembly, a wheel having an axially extending groove in its periphery, a blade having a base portion partly filling said groove, said base portion and said groove having dovetail portions retaining said blade against radial movement in said groove, a rotatable blade locking means having a shank located in said groove and having head portions at either end of said shank for engaging said base portion and said wheel when said locking means is rotated to a blade locking position to prevent axial movement of said blade, and deformable retaining means located in the bottom of said groove between said wheel and said shank for preventing rotation of said locking means from said blade locking position.

2. In a turbo-machine rotor assembly, a wheel having an axially extending groove in its periphery, an axially extending slot at the bottom of said groove, a blade having a base portion disposed in said groove and extending to said slot, said base portion and said groove having dovetail portions retaining said blade against radial movement in said groove, a rotatable blade locking means having a shank located in said slot and having head portions at either end of said shank for engaging said base portion and said wheel when said locking means is rotated to a blade locking position to prevent axial movement of said blade, and deformable retaining means located in the bottom of said slot for preventing rotation of said locking means from said blade locking position.

3. In a turbo-machine rotor assembly, a wheel having an axially extending groove in its periphery, an axially extending slot at the bottom of said groove, a blade having a base portion disposed in said groove and extending radially to said slot, said base portion and said groove having dovetail portions retaining said blade against radial movement in said groove, a rotatable blade locking means comprising a pin having a shank portion and enlarged head portions at its ends, the shank portion of said pin being located in said slot with said head portions extending axially beyond said slot, said locking means having an axially extending flat surface across said shank and said head portions, said flat surface permitting axial insertion of said blade portion in said groove when said locking means is positioned in said slot with said flat surface radially outward, said head portions engaging said wheel and the ends of said base portions to prevent axial movement of said blade when said locking means is rotated to a position with said flat surface radially inward, and retaining means insertable into said slot between said flat surface and the bottom of said slot when said flat surface is radially inward to prevent rotation of said locking means, said retaining means having ends extending axially beyond said slot for deformation against said wheel to secure said retaining means in said slot.

4. A rotor assembly as claimed in claim 3, in which said shank and said head portions have truncated configurations.

5. A rotor assembly as claimed in claim 3, in which said shank and said head portions have semi-circular configurations.

6. A rotor assembly as claimed in claim 3, in which said shank has a square cross-section and said head portions have rectangular configurations.

7. In a turbo-machine rotor assembly, a wheel having a plurality of axially extending dovetail grooves in its periphery, a slot extending through said wheel at the bottom of each of said grooves, a plurality of blades each having a dovetail base portion of substantially the same configuration as said dovetail grooves for engagement with respective ones of said grooves, the dovetail engagement between the groove and the base portion preventing radial movement of a respective blade on said wheel, a plurality of rotatable blade locking means each comprising a pin having a shank portion and enlarged head portions at its ends, the shank portion of each pin being located in the slot at the bottom of a respective groove with its head portions extending axially beyond the respective slot, each locking means having an axially extending flat surface across the shank and the head portions, said flat surface permitting axial insertion of the associated blade portion into a respective groove when the respective locking means is positioned in the slot with the flat surface radially outward, respective ones of said head portions engaging said wheel and the ends of a respective one of said base portions to prevent axial movement of the respective blade when the locking means is rotated into a position with the flat surface radially inward, a plurality of retaining means each insertable into a respective one of said slots between the respective flat surface of the locking means and the bottom of said slots when the flat surface is radially inward to prevent rotation of the respective locking means, each retaining means having ends extending axially beyond said slot for deformation against said wheel to secure said retaining means in said slot, the respective ends of a plurality of adjacent ones of said retaining means being interconnected so that the plurality of adjacent retaining means may be simultaneously inserted into their associated slots.

8. A rotor assembly as claimed in claim 7, in which respective ends of two adjacent ones of said retaining means are interconnected so that the two retaining means may be simultaneously inserted into their associated slots.

9. In a turbo-machine rotor assembly, a wheel having an axialy extending groove in its periphery, an axially extending rectangular slot at the bottom of said groove, a blade having a base portion disposed in said groove and extending radially to said slot, said base portion and said groove having dovetail portions retaining said blade against radial movement in said groove, a rotatable blade locking means comprising a pin having a shank portion with a transverse dimension no greater than the smallest transverse dimension of said slot and also having assymetrically enlarged head portions at either end thereof, the shank portion of said pin being located in said slot with the head portions extending axially beyond the slot, said locking means having an axially extending flat surface across said shank and said head portions, said flat surface permitting axial insertion of said blade portion in either direction into said groove when the locking means is positioned in the slot with the flat surface radially outward, the assymetrically enlarged head portions engaging the wheel and the ends of the base portions to prevent axial movement of the blade when the locking means is rotated to a position with the flat surface radially inward, and a retaining strip of rectangular cross section insertable into the slot between the flat surface of the locking means and the bottom of the slot when the flat surface is radially inward to prevent rotation of the locking means, said retaining strip having at least one end thereof extending axially beyond the slot for deformation against the wheel to secure the retaining means in the slot.

References Cited in the file of this patent

UNITED STATES PATENTS

| 2,801,074 | Brown | July 30, 1957 |
| 2,963,271 | McCormick | Dec. 6, 1960 |
| 2,971,744 | Szydlowski | Feb. 14, 1961 |

FOREIGN PATENTS

| 834,408 | Germany | Mar. 20, 1952 |
| 1,033,676 | Germany | July 10, 1958 |
| 672,401 | Great Britain | May 21, 1952 |
| 793,931 | Great Britain | Apr. 23, 1958 |
| 807,186 | Great Britain | Jan. 7, 1959 |
| 1,095,392 | France | Dec. 22, 1954 |